(12) United States Patent
Carballo et al.

(10) Patent No.: US 11,937,614 B2
(45) Date of Patent: *Mar. 26, 2024

(54) SMOKE GENERATING ASSEMBLY FOR AN INDOOR SMOKER

(71) Applicant: Haier US Appliance Solutions, Inc., Wilmington, DE (US)

(72) Inventors: Daniel Carballo, Louisville, KY (US); Andrew Schiller, Louisville, KY (US); Tomas Garces, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 269 days.

This patent is subject to a terminal disclaimer.

(21) Appl. No.: 17/320,384

(22) Filed: May 14, 2021

(65) Prior Publication Data

US 2022/0361515 A1 Nov. 17, 2022

(51) Int. Cl.
*A23B 4/052* (2006.01)

(52) U.S. Cl.
CPC .................. *A23B 4/052* (2013.01)

(58) Field of Classification Search
CPC ........ A23B 4/052; A23B 4/0523; Y02A 40/90
USPC ........................................................ 99/482
See application file for complete search history.

(56) References Cited

U.S. PATENT DOCUMENTS

| 7,530,351 | B2 | 5/2009 | Leverty | |
|---|---|---|---|---|
| 9,510,604 | B2 | 12/2016 | Ahmed | |
| 10,105,007 | B2* | 10/2018 | Colston | A47J 37/0704 |
| 10,292,531 | B1* | 5/2019 | Hancock | A23B 4/0523 |
| 2017/0215641 | A1* | 8/2017 | DeBruler | A47J 37/0704 |
| 2018/0279634 | A1* | 10/2018 | Norris | A23B 4/052 |
| 2019/0290066 | A1* | 9/2019 | Colston | A47J 37/0763 |
| 2019/0293295 | A1 | 9/2019 | Altenritter | |

FOREIGN PATENT DOCUMENTS

KR 101579258 B1 1/2016

* cited by examiner

*Primary Examiner* — Dana Ross
*Assistant Examiner* — Joseph W Iskra
(74) *Attorney, Agent, or Firm* — Dority & Manning, P.A.

(57) ABSTRACT

A smoke generating assembly for an indoor smoker includes a smoke barrel having a rotating auger positioned therein. The smoke barrel may be supplied with combustible material at a first end of the smoke barrel and the auger may be intermittently rotated to advance the combustible material toward a second end of the smoke barrel and over a smoldering heater to generate a flow of smoke. The smoldering heater may be spaced apart from the smoke barrel by an igniter gap that permits pellet dust from the combustible material to fall into the container below, leaving only solid combustible material to pass through the smoldering heater for combustion.

20 Claims, 7 Drawing Sheets

SMOKE GENERATING ASSEMBLY FOR AN INDOOR SMOKER

FIELD OF THE INVENTION

The present subject matter relates generally to indoor smokers, and more particularly to smoke generating assemblies for indoor smokers.

BACKGROUND OF THE INVENTION

Conventional smokers include a smoking chamber and a firebox positioned within or fluidly coupled to the smoking chamber. The firebox is filled with a combustible material, such as wood or wood byproducts that are ignited or otherwise heated to generate smoke and/or heat. The heat and smoke are routed into the smoking chamber to impart flavor on and cook food items positioned within the smoking chamber. One or more heating elements may be positioned within the smoking chamber and the firebox to maintain the temperatures necessary both for cooking the food and for generating the desired amount of smoke.

Notably, certain conventional meat smokers rely on compressed hardwood pellets as a source of fuel and/or smoke. The nature of hardwood pellets being an organic material means that the fuel is susceptible to drying out, falling apart, swelling to moisture, generating pellet dust, etc. In smokers that rely on consistent fully-formed pellets, pellet dust can pose a problem. For example, pellet dust combusts too quickly and can accumulate on the surfaces on components, water reservoirs, etc. Furthermore, pellet degradation occurs significantly more rapidly when the barrel is at elevated temperatures. Higher temperatures in the barrel remove the moisture from the pellets and cause them to break down, generating more dust.

Accordingly, a smoker that has features for improved smoke generation would be useful. More specifically, a smoke generating assembly with improved temperature control and ability to manage pellet dust would be particularly beneficial.

BRIEF DESCRIPTION OF THE INVENTION

Aspects and advantages of the invention will be set forth in part in the following description, may be apparent from the description, or may be learned through practice of the invention.

In one exemplary embodiment, an indoor smoker is provided including a cabinet, a smoking chamber positioned within the cabinet, and a smoke generating assembly for providing a flow of smoke into the smoking chamber. The smoke generating assembly includes a smoke barrel defining a smoldering chamber that extends between a first end and a second end along a central axis, the smoke barrel being configured for receiving combustible material, an auger positioned within the smoke barrel and being rotatable about the central axis for selectively urging the combustible material from the first end toward the second end of the smoldering chamber, and a smoldering heater positioned adjacent the smoke barrel for smoldering the combustible material as the auger advances the combustible material past the smoldering heater, wherein an igniter gap is defined between the second end of the smoke barrel and the smoldering heater.

In another exemplary embodiment, a smoke generating assembly for providing a flow of smoke in an indoor smoker is provided. The smoke generating assembly includes a smoke barrel defining a smoldering chamber that extends between a first end and a second end along a central axis, the smoke barrel being configured for receiving combustible material, an auger positioned within the smoke barrel and being rotatable about the central axis for selectively urging the combustible material from the first end toward the second end of the smoldering chamber, and a smoldering heater positioned adjacent the smoke barrel for smoldering the combustible material as the auger advances the combustible material past the smoldering heater, wherein an igniter gap is defined between the second end of the smoke barrel and the smoldering heater.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 1:
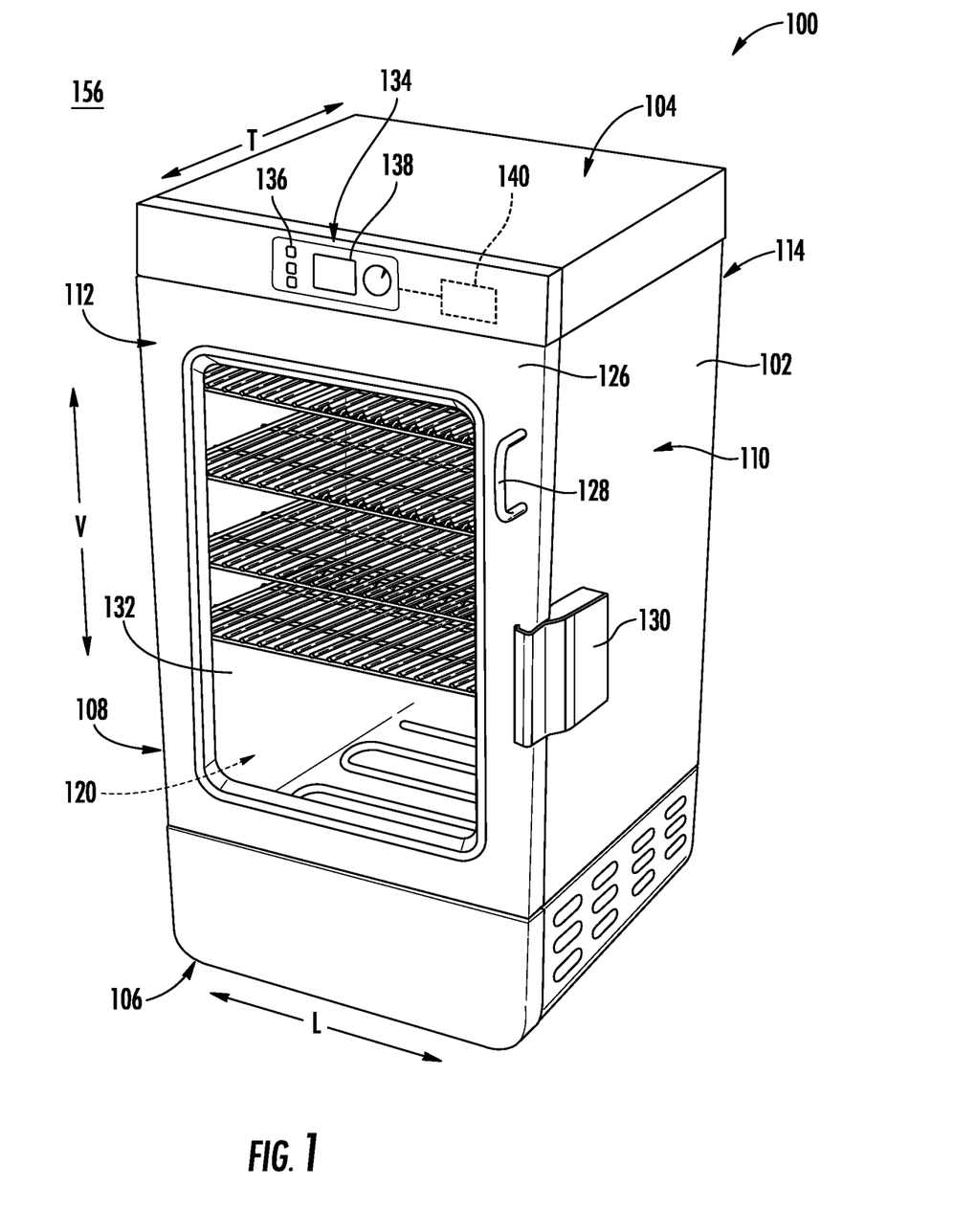
FIG. 1 provides a perspective view of an indoor smoker with a door in a closed position in accordance with an example embodiment of the present disclosure.
Figure 2:
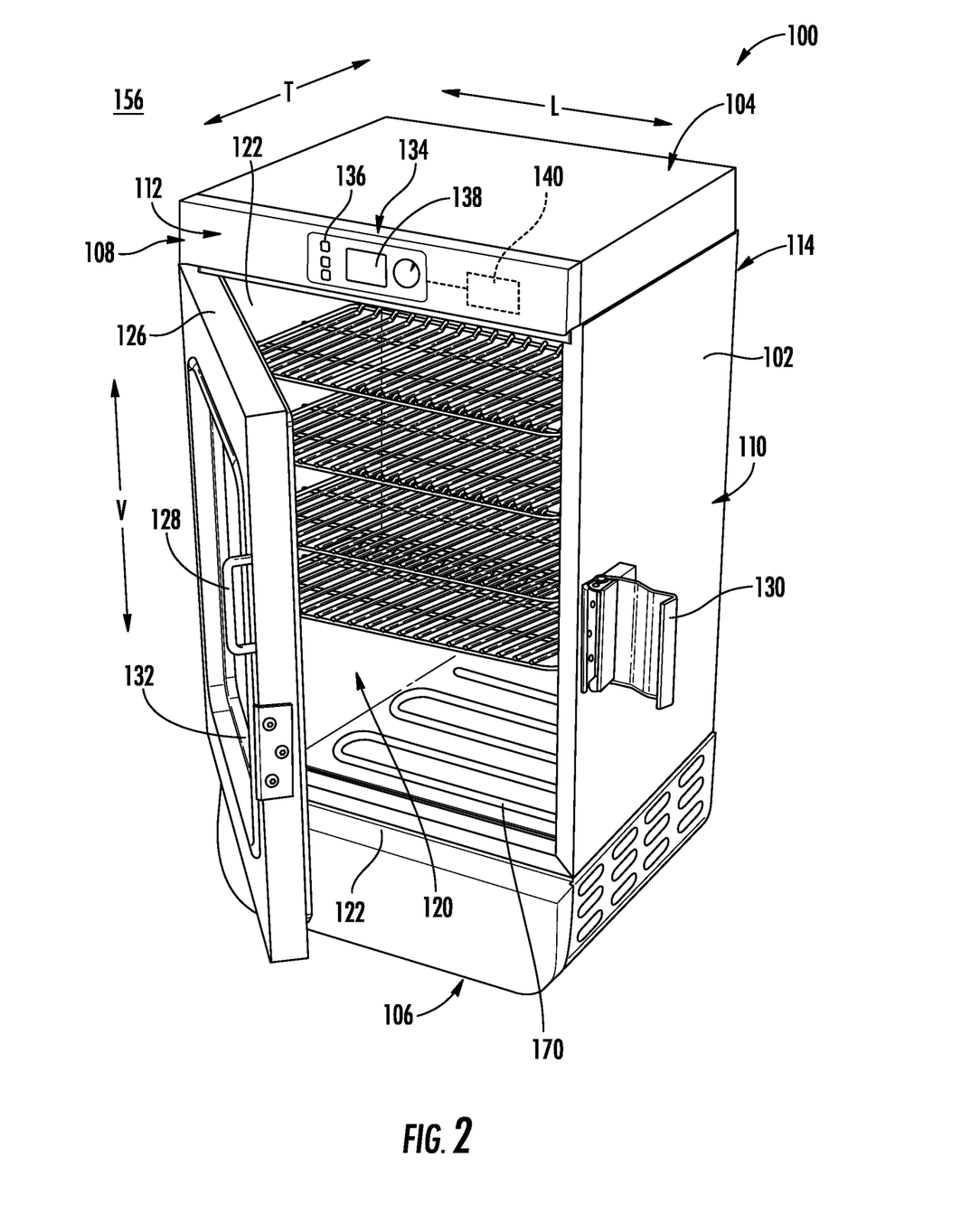
FIG. 2 provides a perspective view the exemplary indoor smoker of FIG. 1 with the door opened.

FIGS. 1 and 2 provide perspective views of an indoor smoker 100 according to an exemplary embodiment of the present subject matter with the door in the closed position and the open position, respectively. Indoor smoker 100 generally defines a vertical direction V, a lateral direction L, and a transverse direction T, each of which is mutually perpendicular, such that an orthogonal coordinate system is generally defined. As illustrated, indoor smoker 100 includes an insulated cabinet 102. Cabinet 102 of indoor smoker 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a smoking chamber 120 which is configured for the receipt of one or more food items to be cooked and/or smoked. In general, smoking chamber 120 is at least partially defined by a plurality of chamber walls 122. Specifically, smoking chamber 120 may be defined by a top wall, a rear wall, a bottom wall, and two sidewalls. These chamber walls 122 may define smoking chamber 120 and an opening through which a user may access food articles placed therein. In addition, chamber walls 122 may be joined, sealed, and insulated to help retain smoke and heat within smoking chamber 120. In this regard, for example, in order to insulate smoking chamber 120, indoor smoker 100 includes an insulation gap 124 (FIG. 4) defined between chamber walls 122 and cabinet 102. According to an exemplary embodiment, insulation gap 124 is filled with insulating material (not shown), such as insulating foam or fiberglass.

Indoor smoker 100 includes a door 126 rotatably attached to cabinet 102 in order to permit selective access to smoking chamber 120. A handle 128 is mounted to door 126 to assist a user with opening and closing door 126 and a latch 130 is mounted to cabinet 102 for locking door 126 in the closed position during a cooking or smoking operation. In addition, door 126 may include one or more transparent viewing windows 132 to provide for viewing the contents of smoking chamber 120 when door 126 is closed and also to assist with insulating smoking chamber 120.

Referring still to FIGS. 1 and 2, a user interface panel 134 and a user input device 136 may be positioned on an exterior of cabinet 102. User interface panel 134 may represent a general purpose Input/Output ("GPIO") device or functional block. In some embodiments, user interface panel 134 may include or be in operative communication with user input device 136, such as one or more of a variety of digital, analog, electrical, mechanical or electro-mechanical input devices including rotary dials, control knobs, push buttons, and touch pads. User input device 136 is generally positioned proximate to user interface panel 134, and in some embodiments, user input device 136 may be positioned on user interface panel 134. User interface panel 134 may include a display component 138, such as a digital or analog display device designed to provide operational feedback to a user.

Generally, indoor smoker 100 may include a controller 140 in operative communication with user input device 136. User interface panel 134 of indoor smoker 100 may be in communication with controller 140 via, for example, one or more signal lines or shared communication busses, and signals generated in controller 140 operate indoor smoker 100 in response to user input via user input devices 136. Input/Output ("I/O") signals may be routed between controller 140 and various operational components of indoor smoker 100 such that operation of indoor smoker 100 can be regulated by controller 140.

Controller 140 is a "processing device" or "controller" and may be embodied as described herein. Controller 140 may include a memory and one or more microprocessors, microcontrollers, application-specific integrated circuits (ASICS), CPUs or the like, such as general or special purpose microprocessors operable to execute programming instructions or micro-control code associated with operation of indoor smoker 100, and controller 140 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of an indoor smoker having a single smoking chamber, it should be appreciated that indoor smoker 100 is provided by way of example only. Other smoking appliances having different configurations, different appearances, and/or different features may also be utilized with the present subject matter, e.g., outdoor smokers, conventional oven appliances, or other suitable cooking appliances. Thus, the example embodiment shown in FIG. 1 is not intended to limit the present subject matter to any particular smoking configuration or arrangement. Moreover, aspects of the present subject matter may be used in any other consumer or commercial appliance where it is desirable to regulate a flow of smoke or harmful emissions in an appliance.

Figure 3:
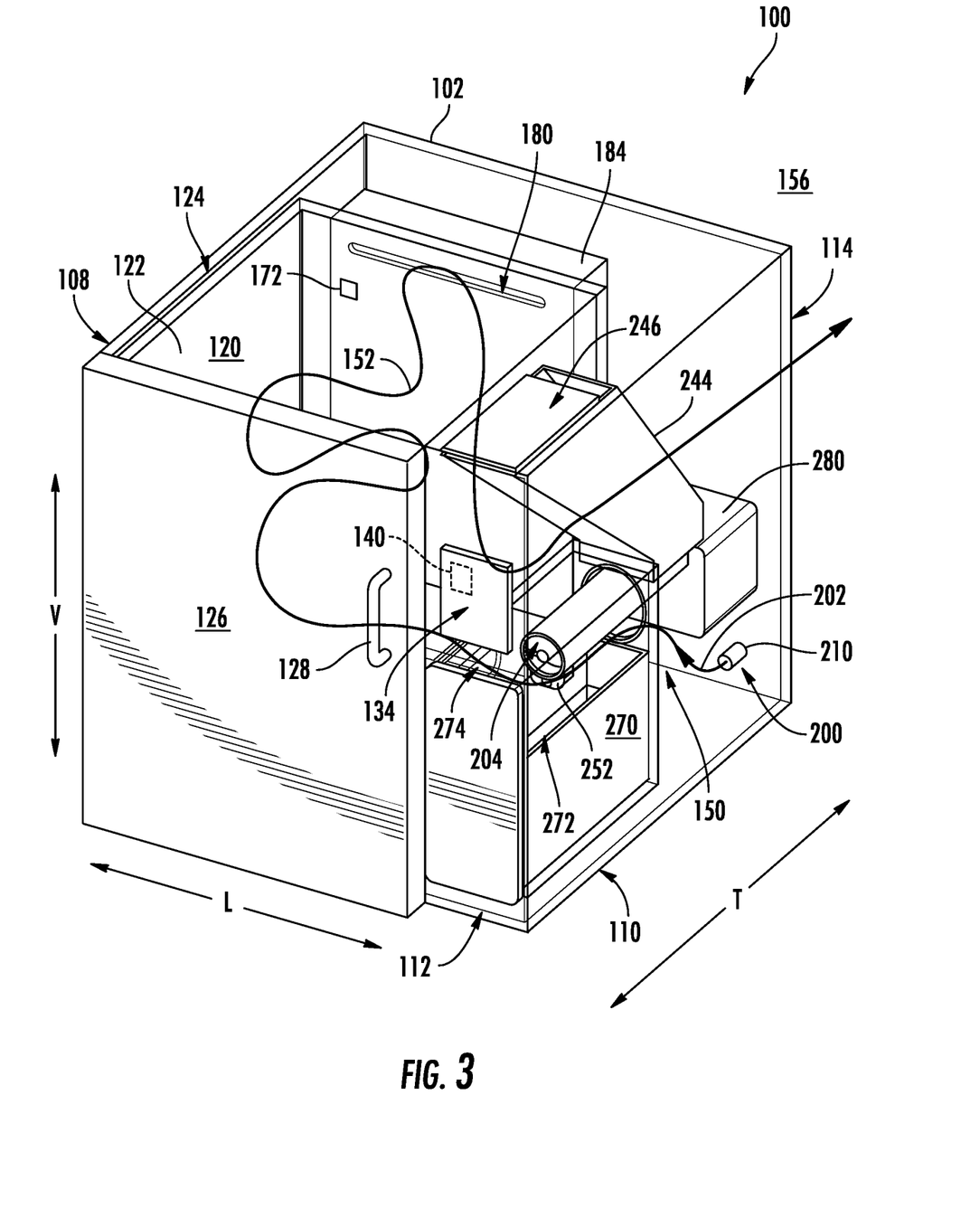
FIG. 3 provides a partial perspective view of an indoor smoker according to an exemplary embodiment of the present subject matter.

Referring now also to FIG. 3, various internal components of an indoor smoker 100 and their respective functions will be described according to an exemplary embodiment of the present subject matter. In this regard, FIG. 3 illustrates a partial perspective view of an indoor smoker 100 similar to that shown in FIG. 1. As shown, indoor smoker 100 generally includes smoking chamber 120 for receiving items to be cooked/smoked, a smoke generating device or smoke generating assembly 150 for generating a flow of smoke (indicated by reference numeral 152 in FIG. 3), and an exhaust system 154 for safely discharging that the air and/or smoke into an indoor environment 156 (i.e., outside of indoor smoker 100). Each of these systems and components will be described in detail below.

Figure 5:
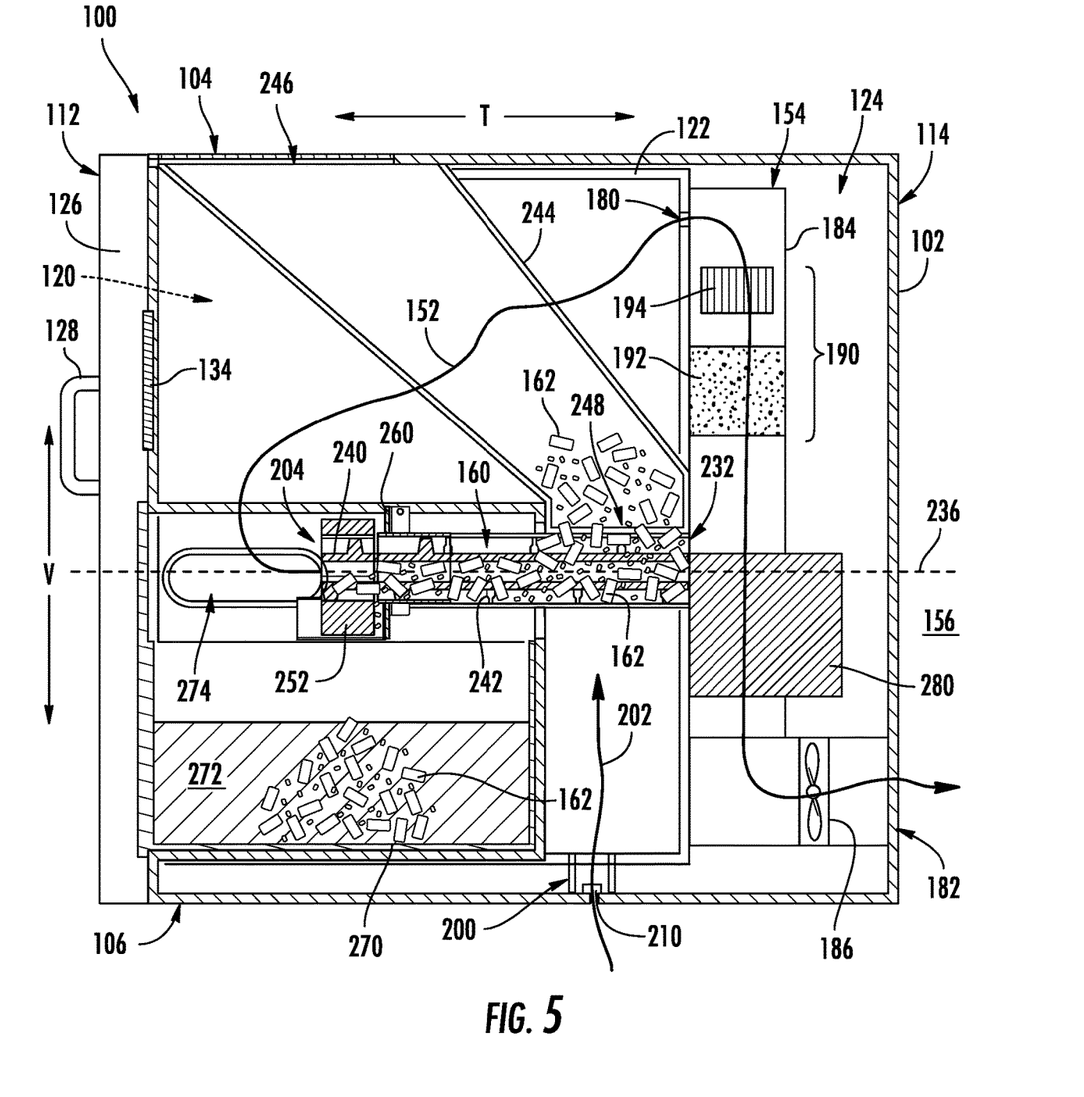
FIG. 5 is a side cross sectional view of the exemplary indoor smoker of FIG. 3 according to an exemplary embodiment of the present subject matter.
Figure 6:
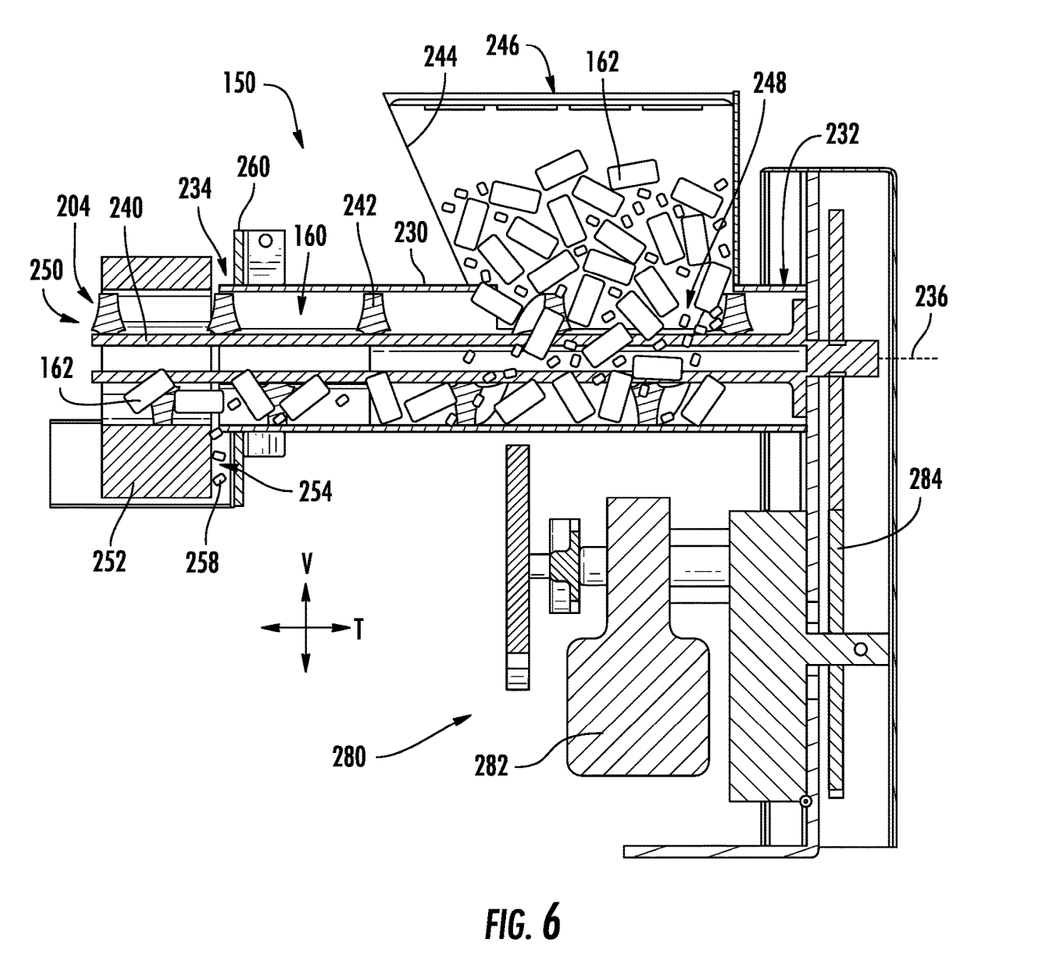
FIG. 6 is a schematic cross sectional view of a smoke generating assembly for use with the exemplary indoor smoker of FIG. 3 according to an exemplary embodiment of the present subject matter.

Referring to FIGS. 5 and 6, smoke generating assembly 150 generally defines a smoldering chamber 160 which is configured for receiving combustible material 162. As used herein, "combustible material" is generally used to refer to any suitable material positioned within smoldering chamber 160 for generating smoke. Specifically, according to exemplary embodiments, combustible material 162 includes wood or wood byproducts, such as wood chunks, wood chips, wood pellets, or wood resin. According to the exemplary embodiment, smoke generating assembly 150 may include a door or another access panel (not shown) for providing selective access to smoldering chamber 160, e.g., to add additional combustible material 162. Smoke generating assembly 150 will be described in more detail below with respect to FIGS. 3 through 7.

Figure 4:
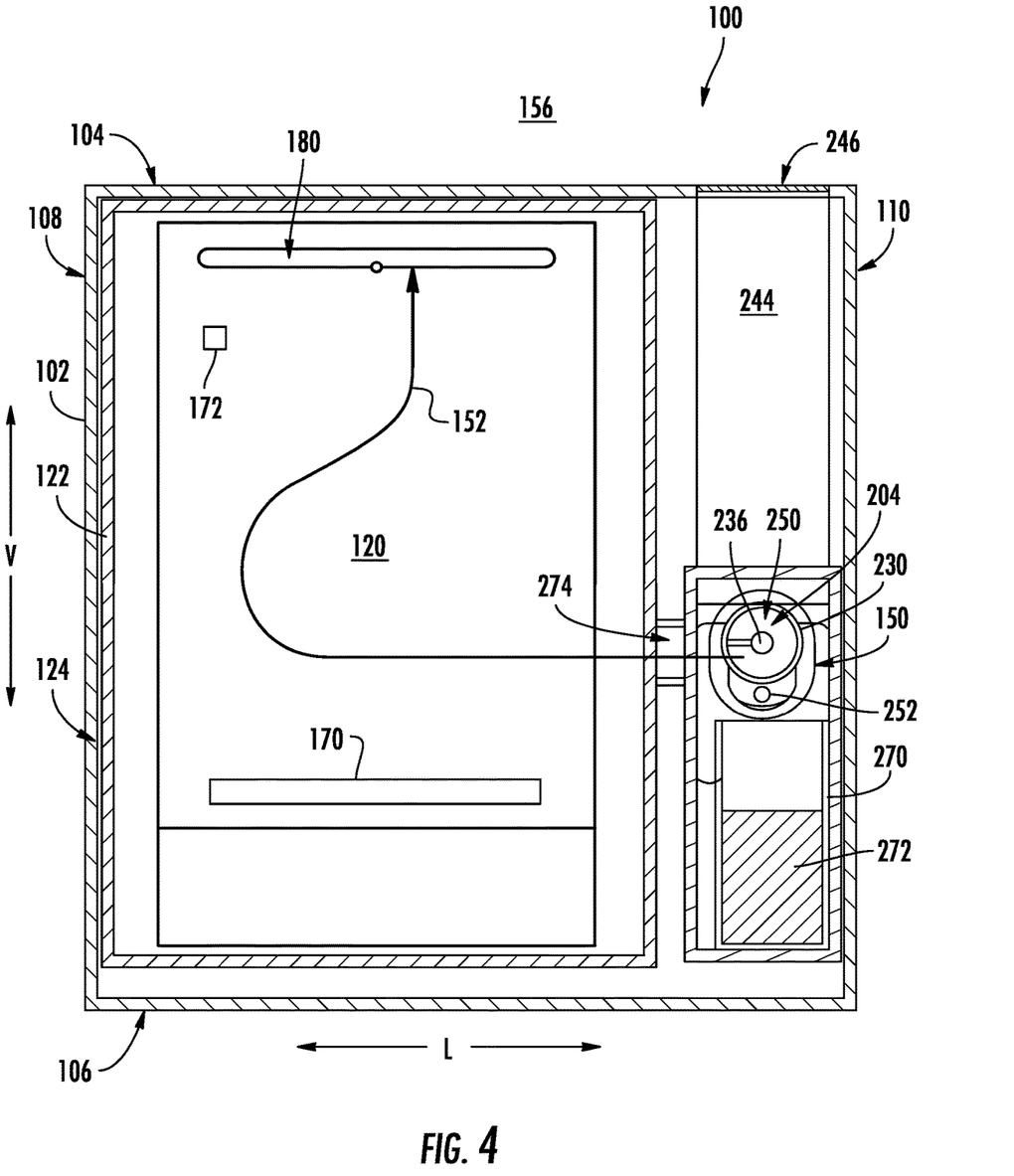
FIG. 4 is a front cross sectional view of the exemplary indoor smoker of FIG. 3 according to an exemplary embodiment of the present subject matter.

As best shown in FIG. 4, in order to ensure a desirable cooking temperature within smoking chamber 120, indoor smoker 100 further includes a chamber heater 170 that is positioned within or otherwise in thermal communication with smoking chamber 120 for regulating the temperature in smoking chamber 120. In general, chamber heater 170 may include one or more heating elements positioned within cabinet 102 for selectively heating smoking chamber 120. For example, the heating elements may be electric resistance heating elements, gas burners, microwave heating elements, halogen heating elements, or suitable combinations thereof. Notably, because chamber heater 170 is operated independently of smoke generating assembly 150 (e.g., as described below), smoking chamber 120 may be maintained at any suitable temperature during a smoking process. More specifically, for example, chamber heater 170 may be turned off or on a very low setting for smoking cheeses or may be turned on high for quickly cooking and smoking meats.

In some embodiments, indoor smoker 100 also includes one or more sensors that may be used to facilitate improved operation of the appliance, such as described below. For example, indoor smoker 100 may include one or more temperature sensors which are generally operable to measure the internal temperature in indoor smoker 100, e.g., within smoking chamber 120 and/or smoldering chamber 160. More specifically, as illustrated, indoor smoker 100 includes a temperature sensor 172 positioned within smoking chamber 120 and being operably coupled to controller 140. In some embodiments, controller 140 is configured to vary operation of chamber heater 170 based on one or more temperatures detected by temperature sensor 172.

As described herein, "temperature sensor" may refer to any suitable type of temperature sensor. For example, the temperature sensors may be thermocouples, thermistors, or resistance temperature detectors. In addition, temperature sensor 172 may be mounted at any suitable location and in any suitable manner for obtaining a desired temperature measurement, either directly or indirectly. Although exemplary positioning of certain sensors is described below, it should be appreciated that indoor smoker 100 may include any other suitable number, type, and position of temperature sensors according to alternative embodiments.

As mentioned briefly above, indoor smoker 100 further includes an exhaust system 154 which is generally configured for safely discharging the flow of smoke 152 from indoor smoker 100. Specifically, according to the illustrated embodiment, exhaust system 154 generally extends between a chamber outlet 180 and a discharge vent 182 defined by cabinet 102 for directing the flow of smoke 152 from smoking chamber 120 to the environment 156. Although an exemplary exhaust system 154 is described below, it should be appreciated that variations and modifications may be made while remaining within the scope of the present subject matter. For example, the routing of ducts, the catalytic converter arrangement, and the types of sensors used may vary according to alternative embodiments.

As shown, exhaust system 154 includes an exhaust duct 184 that generally extends between and provides fluid communication between chamber outlet 180 and discharge vent 182. Indoor smoker 100 further includes an air handler 186 that is operably coupled with exhaust duct 184 facilitating the smoldering process and smoke generating process. For example, air handler 186 urges the flow of smoke 152 through exhaust duct 184 and out of discharge vent 182 to environment 156. According to the illustrated exemplary embodiment, air handler 186 is an axial fan positioned within exhaust duct 184. However, it should be appreciated that according to alternative embodiments, air handler 186 may be positioned at any other suitable location and may be any other suitable fan type, such as a tangential fan, a centrifugal fan, etc.

In addition, according to an exemplary embodiment, air handler 186 is a variable speed fan such that it may rotate at different rotational speeds, thereby generating different air flow rates. In this manner, the amount of smoke drawn from smoldering chamber 160 may be continuously and precisely regulated. Moreover, by pulsing the operation of air handler 186 or throttling air handler 186 between different rotational speeds, the flow of smoke 152 drawn into smoking chamber 120 may enter from a different direction, may have a different flow velocity, or may generate a different flow pattern within smoking chamber 120. Thus, by pulsating the variable speed fan or otherwise varying its speed, the flow of smoke 152 may be randomized, thereby eliminating stagnant regions within smoking chamber 120 and better circulating the flow of smoke 152 to provide a more even cooking/smoking profile.

As illustrated, indoor smoker 100 further includes a catalytic converter 190 which is positioned within exhaust duct 184 for lowering or removing volatile organic compounds (VOCs) from the flow of smoke 152. As used herein, "catalytic converter" or variations thereof may be used to refer to any component, machine, or device that is configured for removing or lowering volatile organic compounds (VOCs), toxic gases, harmful emissions, pollutants, or undesirable compounds from a flow of air and smoke. For example, according to the illustrated embodiment, catalytic converter 190 generally includes a catalytic element 192 and a catalyst heater 194.

In general, catalytic element 192 includes a material that causes an oxidation and a reduction reaction. For example, precious metals such as platinum, palladium, and rhodium are commonly used as catalyst materials, though other catalysts are possible and within the scope of the present subject matter. In operation, the catalytic element 192 may combine oxygen ($O_2$) with carbon monoxide (CO) and unburned hydrocarbons to produce carbon dioxide ($CO_2$) and water ($H_2O$). In addition, according to exemplary embodiments, catalytic element 192 may remove nitric oxide (NO) and nitrogen dioxide ($NO_2$).

Notably, catalytic converters typically require that the catalyst be heated to a suitably high temperature in order to catalyze the necessary chemical reactions. Therefore, catalyst heater 194 is in thermal communication with catalytic element 192 for heating it to a suitable temperature, such as approximately 800° F. According to the illustrated embodiment, catalyst heater 194 is positioned upstream of catalytic element 192 to provide thermal energy through convection. However, it should be appreciated that according to alternative embodiments, catalyst heater 194 may be in direct contact with catalytic element 192 to provide thermal energy through conduction, or may be thermally coupled to catalytic element 192 in any other suitable manner. In order to ensure a catalyst temperature of catalytic element 192 remains above a temperature suitable for controlling emissions, indoor smoker 100 may further include a catalyst temperature sensor (not shown) that may be monitored by controller 140.

Referring now specifically to FIGS. 3 through 7, the construction and operation of smoke generating assembly 150 will be described in more detail according to an exemplary embodiment of the present subject matter. As best shown in FIG. 5, indoor smoker 100 defines an air inlet 200 for receiving air to support the combustion or smoldering process. Specifically, air inlet 200 is configured for receiving a flow of combustion air (indicated by reference numeral 202 in FIG. 5) from the ambient environment 156 surrounding indoor smoker 100 or from another air supply source. During a smoking process, combustible material 162 is ignited and the flow of combustion air 202 supports the smoldering process to generate the flow of smoke 152. Smoke generating assembly 150 further defines a smoke outlet 204 for providing a flow of smoke 152 into smoking chamber 120 during a smoking operation, as will be described in detail below.

In addition, indoor smoker 100 may further include features for preventing or regulating the flow of combustion air 202 from entering indoor smoker 100 from environment 156 when the flow of such air is not desired. In this regard, for example, indoor smoker 100 may include an inlet check valve 210 which is operably coupled to air inlet 200. In general, this check valve prevents the flow of combustion air 202 from entering smoldering chamber 160 when not desired. For example, inlet check valve 210 may have a "cracking pressure," which is used herein to refer to the pressure, or more precisely the negative pressure, required within smoldering chamber 160 to open inlet check valve 210. In this manner, inlet check valve 210 may be designed to permit the flow of combustion air 202 only when air handler 186 is operating and urging air through smoldering chamber 160, thus facilitating the quick and effective asphyxiation of combustible material 162 within smoldering chamber 160 when desired.

Figure 7:
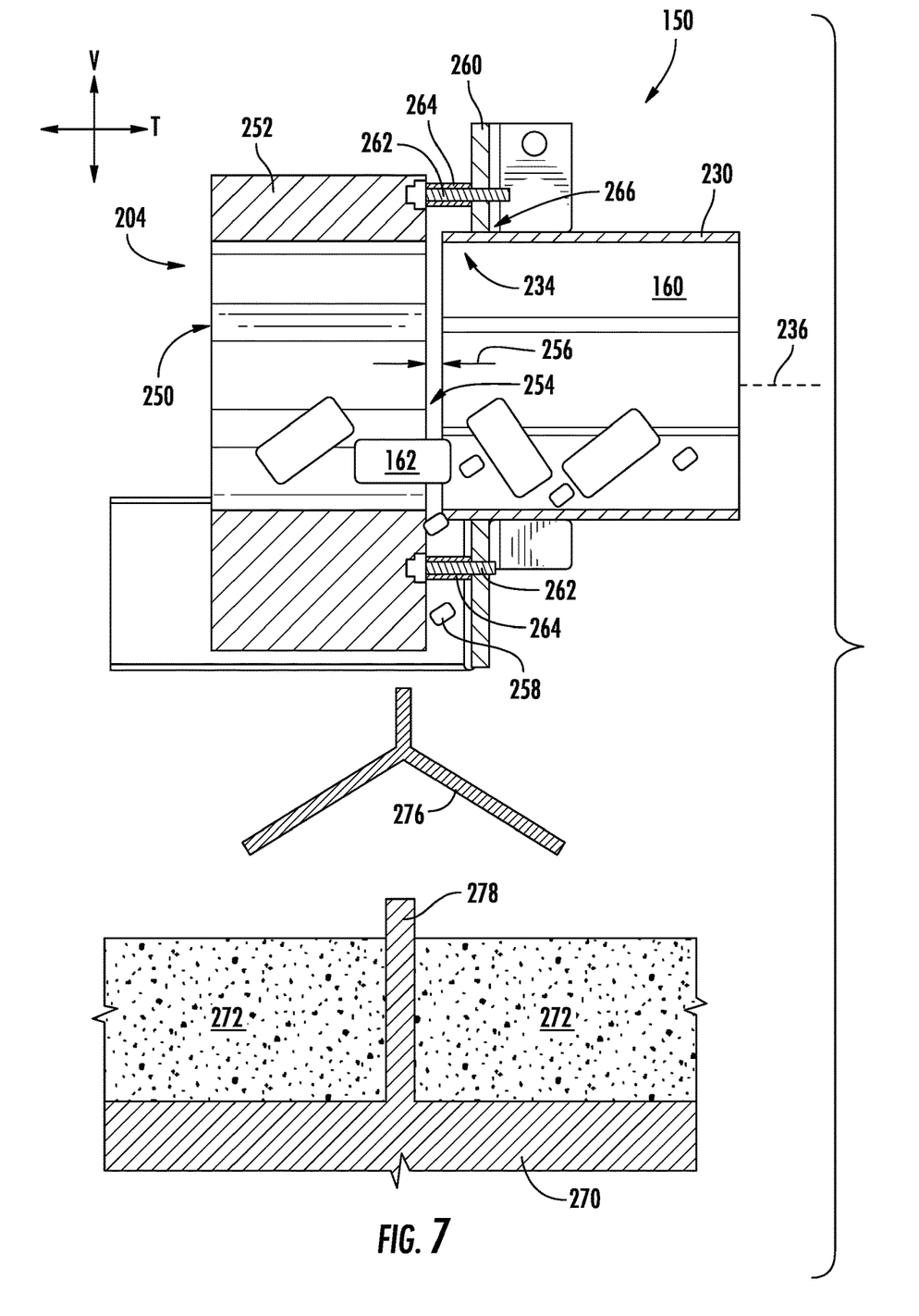
FIG. 7 is a schematic cross sectional view of a smoldering heater and a smoke barrel of the exemplary smoke generating assembly of FIG. 6 with a rotating auger removed for clarity according to an exemplary embodiment of the present subject matter.

Referring now specifically to FIGS. 5 through 7, according to the illustrated embodiment, smoke generating assembly 150 generally includes a smoke barrel 230 that defines smoldering chamber 160. Specifically, smoke barrel 230 extends between a first end 232 and a second end 234 substantially along a central axis 236. Specifically, as illustrated, central axis 236 extends substantially within a horizontal plane within cabinet 102, e.g., directly along the transverse direction T. In general, smoke barrel 230 is configured for receiving the combustible material 162 and facilitating a smoldering process. As shown, smoke barrel 230 has a substantially cylindrical shape and is formed from a substantially rigid and temperature resistant material, such as steel. However, it should be appreciated that smoke barrel 230 may be formed from different materials, may have different geometries, and may be configured differently within cabinet 102 according to alternative embodiments of the present subject matter.

Smoke generating assembly 150 further includes a rotating auger 240 that is rotatably mounted within smoldering chamber 160 and generally rotates about central axis 236, e.g., such that rotating auger 240 is coaxial with smoke barrel 230. As shown, an outer diameter of rotating auger 240 is substantially equivalent to an inner diameter of smoke barrel 230, such that a helical blade 242 of rotating auger 240 may advance combustible material 162 within smoldering chamber 160 as rotating auger 240 is rotated about central axis 236. More specifically, the combustible material 162 is generally urged from first end 232 toward second end 234 of smoke barrel 230.

As illustrated, smoke generating assembly 150 may further include a hopper 244 that is generally configured for storing and selectively depositing combustible material 162 into smoldering chamber 160. More specifically, as illustrated, hopper 244 may be a large tapered reservoir with a top opening 246 positioned at top 104 of cabinet 102. A user may fill hopper 244 by pouring or providing combustible material 162 into hopper 244 through top opening 246. Hopper 244 may taper toward a supply opening 248 positioned at a bottom of hopper 244. As shown, supply opening 248 opens into smoldering chamber 160 at a top of smoke barrel 230. More specifically, supply opening 248 is joined to smoke barrel 230 proximate first end 232 of smoke barrel 230. In this manner, fresh combustible material 162 is typically provided into smoldering chamber 160 proximate first end 232 of smoke barrel 230 and is urged by rotating auger 240 toward second end 234 of smoke barrel 230. As illustrated, smoke generating assembly 150 may generally define a discharge port 250 proximate second end 234 of smoke barrel 230 for discharging consumed combustible material 162.

As best shown in FIGS. 6 and 7, smoke generating assembly 150 includes one or more smoldering heaters 252 which are positioned adjacent smoldering chamber 160 or otherwise placed in thermal communication with combustible material 162 stored in smoldering chamber 160 for smoldering combustible material 162. According to an exemplary embodiment, smoldering heater 252 may include one or more cartridge heaters or silicon nitride igniters. Alternatively, smoldering heater 252 may include any other suitable type, position, and configuration of heating elements. As used herein, the term "heating element," "heaters," and the like may generally refer to electric resistance heating elements, gas burners, microwave heating elements, halogen heating elements, or suitable combinations thereof.

As used herein, the verb "smolder" or variations thereof is intended to refer to burning a combustible material (e.g., combustible material 162) slowly such that smoke is generated but little or no flame is generated. In this manner, the combustible material is not expended quickly, but a large amount of smoke is generated for the smoking process. Notably, the burn rate of combustible material and the amount of smoke generated is regulated using smoldering heater 252 positioned within smoldering chamber 160. For typical combustible material used in smokers, e.g., wood and wood byproducts, a typical smoldering temperature is between about 650° F. and 750° F. However, the exact temperature may vary depending on the combustible material used, the air flow rate through smoldering chamber 160, the level of combustible material 162, and other factors.

According to the exemplary illustrated embodiment, smoldering heater 252 is positioned proximate second end 234 of smoke barrel 230. For example, smoldering heater 252 may at least partially define smoke outlet 204 of smoke generating assembly 150. Specifically, as illustrated, smoke outlet 204 corresponds to discharge port 250 of smoke generating assembly 150, which may simply be an open end of smoldering heater 252. In this manner, as rotating auger 240 rotates, combustible material 162 positioned within smoldering chamber 160 is slowly but progressively advanced past smoldering heater 252. After combustible material 162 positioned near smoldering heater 252 is consumed or smoldered, rotating auger 240 may rotate to advance the consumed material toward discharge port 250 where it may be pushed out of smoldering chamber 160.

Specifically, as illustrated, smoldering heater 252 may be positioned adjacent smoke barrel 230, e.g., downstream of second end 234 of smoke barrel 230. More specifically, according to exemplary embodiments of the present subject matter, smoldering heater 252 may be spaced apart from the second end 234 of smoke barrel 230 to define an igniter gap 254 between smoke barrel 230 and smoldering heater 252. More specifically, igniter gap 254 may be a void defined between smoke barrel 230 and smoldering heater 252 and may define a gap width 256 measured along the central axis 236 of smoke barrel 230.

As explained briefly above, combustible material 162 may have a general tendency of at least partially breaking down and forming dust or other small particles, referred to herein generally as pellet dust 258. In this regard, although combustible material 162 may initially be provided as solid pellets, these pellets may break down, e.g., due to agitation within hopper 244 or under the force of rotating auger 240 such that pellet dust 258 is formed. Moreover, as smoke generating assembly 150 is heated by smoldering heater 252, the original combustible material 162 may have a tendency to dry out and further accelerate the process of pellets breaking down into pellet dust 258. Notably, this pellet dust 258 may create undesirable conditions, e.g., by creating a dust layer or "raft" with in a water container (e.g., as described in more detail below) which may support combustible material 162 above the water thereby preventing the combustible material 162 from being extinguished when dumped into the extinguishing container. In addition, this pellet dust may combust in an undesirable manner or at an undesirable rate, may coat surfaces of smoke generating assembly 150, etc.

As a result, igniter gap 254 may be particularly sized and positioned for facilitating the removal, collection, and/or rerouting of pellet dust 258 while retaining usable combustible material 162 for smoldering via smoldering heater 252. In this regard, for example, gap width 256 may be between about 10 and 300 thousandths of an inch, between about 50 and 200 thousandths of an inch, or about 100 thousandths of an inch. It should be appreciated that the spacing may vary as needed depending on the application, the combustible material used, and the size, shape, and geometry of combustible material 162. In addition, it should be appreciated that igniter gap 254 may be integrally formed into smoke barrel 230 and/or smoldering heater 252 instead of having a physical separation between these two components. In this regard, for example, one or both of smoldering heater 252 and smoke barrel 230 may define one or more apertures for permitting pellet dust 258 to fall through these components under the force of gravity.

As best shown in FIG. 7, smoldering heater 252 may be mounted within indoor smoker 100 using a mounting bracket 260. In this regard, mounting bracket 260 may be secured to cabinet 102 or another suitable structure within indoor smoker 100 for supporting smoldering heater 252 adjacent smoke barrel 230 and in a manner that defines igniter gap 254. For example, as illustrated, smoldering heater 252 may be mounted to the mounting bracket 260 using a plurality of fasteners 262 that each pass through an insulating standoff 264, e.g., such as a ceramic standoff. As explained below, the standoffs 264 may be used to maintain the desirable igniter gap 254 as well as provide a thermal break between smoke barrel 230 and smoldering heater 252.

In addition, mounting bracket 260 may define a barrel aperture 266 that is designed to receive second end 234 of smoke barrel 230. Specifically, for example, second end 234 of smoke barrel 230 may be positioned and/or float within barrel aperture 266 such that the igniter gap 254 may be maintained between smoke barrel 230 and smoldering heater 252. Notably, in addition to permitting pellet dust 258 to fall out of smoke generating assembly 150 prior to passing through smoldering heater 252, igniter gap 254 may serve to maintain a thermal break or facilitate thermal isolation between smoldering heater 252 and smoke barrel 230. In this manner, further drying out of combustible material 162 may be prevented and pellet dust 258 may be minimized prior to the combustible material 162 reaching smoldering heater 252.

According to exemplary embodiments, smoldering heater 252 may be positioned on a distal end of rotating auger 240, e.g., aligned along central axis 236 proximate second end 234. As such, rotating auger 240 may pass through smoke barrel 230 and through a central aperture smoldering heater 252 to extend out of discharge port 250. In this manner, rotating auger 240 may serve to advance combustible material 162 from first end 232 of smoke barrel 230, past second end 234 of smoke barrel 230, through and across smoldering heater 252, then out of discharge port 250.

According to an exemplary embodiment, a container 270 may be configured for receiving consumed combustible material 162 when discharged from smoke generating assembly 150. In this regard, for example, container 270 may be positioned directly below smoke barrel 230, smoldering heater 252, and/or discharge port 250 such that used combustible material 162 may fall therein and immediately extinguish. For example, according to the illustrated embodiment, container 270 is filled with water 272 to immediately extinguish combustible material 162 when dropped into container 270. However, it should be appreciated that other liquids or materials for extinguishing combustible material 162 may be contained within container 270. In addition, as illustrated, container 270 may be positioned below or directly define a chamber inlet 274 that is positioned adjacent smoke outlet 204. In this manner, the flow of smoke 152 exiting smoke barrel 230 may pass directly into smoking chamber 120 through chamber inlet 274 while consumed combustible material 162 may fall directly into water 272 within container 270.

According to alternative embodiments, consumed combustible material 162 may be discharged in any other suitable manner into to any other suitable container or reservoir. According to exemplary embodiments such as that illustrated in FIG. 7, smoke generating assembly 150 may further include a dust deflector 276 that is positioned below smoldering heater 252 for directing pellet dust 258 toward a rear of container 270. In this manner, pellet dust 258 may collect within one region of container 270, e.g., directly below igniter gap 254. By contrast, the remaining combustible material 162 may be advanced through smoldering heater 252 and may be discharged through discharge port 250 to a different region within container 270. As a result, this smoldering combustible material 162 may be immediately extinguished instead of floating on top of a collection or agglomeration of pellet dust 258.

Specifically, according to the illustrated embodiment, dust deflector 276 may generally extend toward a rear, bottom of container 270. In addition, according to exemplary embodiments, another portion of dust deflector 276 may extend below discharge port 250 and toward a front bottom of container 270. Thus, combustible material 162 and pellet dust 258 be separated and directed to separate regions within container 270. According to still other embodiments, container 270 may include a divider wall 278 that divides container 270 into a first reservoir and a second reservoir. The divider wall 278 may be positioned directly below smoldering heater 252 such that combustible material 162 that passes through discharge port 250 falls into the first reservoir and is separated from pellet dust 258 which falls through igniter gap 254 upstream of smoldering heater 252 and into the second reservoir.

As best illustrated in FIG. 6, smoke generating assembly 150 may further include a drive mechanism 280 that is mechanically coupled to rotating auger 240. Controller 140 (or another dedicated controller) may be in operative communication with drive mechanism 280 and may be configured for intermittently rotating the rotating auger 240 to advance combustible material 162 along central axis 236. Specifically, as illustrated, drive mechanism 280 may include a drive motor 282 and a transmission assembly 284 or another suitable geared arrangement for transferring torque from drive motor 282 to rotating auger 240. As used herein, "motor" may refer to any suitable drive motor and/or transmission assembly for driving rotating auger 240. For example, drive motor 282 may be a brushless DC electric motor, a stepper motor, or any other suitable type or configuration of motor. For example, drive motor 282 may be an AC motor, an induction motor, a permanent magnet synchronous motor, or any other suitable type of AC motor. In addition, drive motor 282 and transmission assembly 284 may include any suitable motor or transmission sub-assemblies, clutch mechanisms, or other components.

In order to facilitate proper smoldering of combustible material 162, it may be desirable to drive rotating auger 240 intermittently, e.g., in a non-continuous manner. Specifically, according to an exemplary embodiment, rotating auger 240 may be rotated for a particular time duration once during every predetermined rotation period. For example, the time duration of rotation may be the amount of time drive mechanism 280 should drive rotating auger 240 to discharge all combustible material 162 that is smoldering from smoke barrel 230. In addition, the predetermined rotation period may be the amount of time necessary for a fresh portion of the smoldering material 162 to be consumed. Notably, drive mechanism 280 may discharge combustible material 162 from smoke barrel 230 before combustible material 162 is fully consumed, e.g., to prevent forming ash which may introduce acrid smoke flavors. According to an exemplary embodiment, the time duration of rotation is approximately 12 seconds while the predetermined rotation period is three minutes. Other rotation schedules are possible and within the scope of the present subject matter. Indeed, such rotation schedules may vary based on a variety of factors, such as the combustible material used, the temperature of the smoldering heater, the rate of air flow through smoke barrel 230, etc.

Thus, during operation of indoor smoker 100, air handler 186 draws the flow of combustion air 202 into smoldering chamber 160 through air inlet 200. The flow of combustion air 202 and combustible material 162 in the smoldering chamber 160 generate the flow of smoke 152 which is drawn into smoking chamber 120 as described herein. The flow of smoke 152 passes through smoking chamber 120 for performing a smoking process on food items positioned therein before exiting smoking chamber 120 through chamber outlet 180. Air handler 186 then continues to urge the flow of smoke 152 through catalytic converter 190 and exhaust duct 184 before passing out discharge vent 182.

In sum, aspects of the present disclosure are directed to systems and methods for generating high quality smoke by using a combination of a temperature controlled heated surface and an auger that advances wood pellets onto such heated surface. By keeping the temperature of said heater at a desired temperature (e.g., 700° F.) as wood pellets get pushed by the auger and contact the heater, they smolder at the right temperature for a controlled period of time. Once pellets have smoldered or smoked for a controlled period of time, the auger advances, pushing the consumed pellets away from the heater while moving fresh new pellets on top of the heater. This process is repeated to continuously generate high quality smoke.

In addition, the smoldered pellets may be advanced until they fall into a water reservoir or another device for quickly extinguishing the pellets. Moreover, pellet dust that is formed as the wood pellets are advanced through smoke generating assembly 150 may be separated from the solid pellets prior to passing through the smoldering heater to prevent issues between interaction of solid pellets and pellet dust. This process provides several advantages. For example, by extinguishing the smoldering pellets in water, smoke generation is stopped before pellets are turned completely into ash. Notably, once wood pellets start smoldering they would typically continue smoldering until they turn to ash because the smoldering process is a self-sustaining and exothermic process if given the right conditions. Therefore a way to stop the generation of smoke is important to avoid generating acrid smoke flavors. In addition, extinguishing the pellets in this manner allows the user to evacuate the cavity before opening the door to access the food. This prevents smoke from billowing out from the cavity into the kitchen/house. During evacuation, the igniter may be turned off and the auger may turn on for a period of time to push the smoking pellets into the water. The igniter cools down rapidly so new pellets are not smoldered. Another advantage of extinguishing the pellets in a water reservoir is that this generates puffs of steam which are introduced into the cavity, thereby keeping the cavity and food moist which helps the smoke molecules stick to the food to enhance the flavor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An indoor smoker comprising:
   a cabinet;
   a smoking chamber positioned within the cabinet; and
   a smoke generating assembly for providing a flow of smoke into the smoking chamber, the smoke generating assembly comprising:
      a smoke barrel defining a smoldering chamber that extends between a first end and a second end along a central axis, the smoke barrel being configured for receiving combustible material;
      an auger positioned within the smoke barrel and being rotatable about the central axis for selectively urging the combustible material from the first end toward the second end of the smoldering chamber;
      a smoldering heater positioned adjacent the smoke barrel for smoldering the combustible material as the auger advances the combustible material past the smoldering heater, wherein an igniter gap is defined between the second end of the smoke barrel and the smoldering heater;
      a container positioned below the smoke barrel and the smoldering heater for receiving and extinguishing the combustible material; and
      a dust deflector positioned below the smoldering heater for directing pellet dust toward a rear of the container.

2. The indoor smoker of claim 1, wherein the container is fillable with water.

3. The indoor smoker of claim 1, wherein the dust deflector is angled downward along a vertical direction and toward the smoke barrel along the central axis.

4. The indoor smoker of claim 1, wherein the container is divided into a first reservoir and a second reservoir, and wherein the combustible material falls into the first reservoir and the dust deflector directs the pellet dust into the second reservoir.

5. The indoor smoker of claim 1, wherein the igniter gap defines a gap width measured along the central axis, wherein the gap width is between about 10 and 300 thousandths of an inch.

6. The indoor smoker of claim 5, wherein the gap width is about 100 thousandths of an inch.

7. The indoor smoker of claim 1, further comprising:
   a mounting bracket fixed to the cabinet; and
   a plurality of fasteners attaching the smoldering heater to the mounting bracket.

8. The indoor smoker of claim 7, further comprising:
   a plurality of standoffs positioned between the mounting bracket and the smoldering heater to define the igniter gap.

9. The indoor smoker of claim 8, wherein each of the plurality of standoffs are ceramic.

10. The indoor smoker of claim 7, wherein the mounting bracket defines a barrel aperture, wherein the second end of the smoke barrel is seated in the barrel aperture.

11. The indoor smoker of claim 1, wherein the smoke barrel defines one or more apertures or slots for passing pellet dust from the smoke barrel.

12. The indoor smoker of claim 1, wherein the smoldering heater defines one or more apertures or slots for passing pellet dust from the smoldering heater.

13. A smoke generating assembly for providing a flow of smoke in an indoor smoker, the smoke generating assembly comprising:
   a smoke barrel defining a smoldering chamber that extends between a first end and a second end along a central axis, the smoke barrel being configured for receiving combustible material;
   an auger positioned within the smoke barrel and being rotatable about the central axis for selectively urging the combustible material from the first end toward the second end of the smoldering chamber;
   a smoldering heater positioned adjacent the smoke barrel for smoldering the combustible material as the auger advances the combustible material past the smoldering heater, wherein an igniter gap is defined between the second end of the smoke barrel and the smoldering heater;
   a container positioned below the smoke barrel and the smoldering heater for receiving and extinguishing the combustible material; and
   a dust deflector positioned below the smoldering heater for directing pellet dust toward a rear of the container.

14. The smoke generating assembly of claim 13, wherein the igniter gap defines a gap width measured along the central axis, wherein the gap width is between about 10 and 300 thousandths of an inch.

15. The smoke generating assembly of claim 13, further comprising:
   a mounting bracket;
   a plurality of fasteners attaching the smoldering heater to the mounting bracket; and
   a plurality of standoffs positioned between the mounting bracket and the smoldering heater to define the igniter gap.

16. The smoke generating assembly of claim 15, wherein the mounting bracket defines a barrel aperture, wherein the second end of the smoke barrel is seated in the barrel aperture.

17. A smoke generating assembly for providing a flow of smoke in an indoor smoker, the smoke generating assembly comprising:
   a smoke barrel defining a smoldering chamber that extends between a first end and a second end along a central axis, the smoke barrel being configured for receiving combustible material;
   an auger positioned within the smoke barrel and being rotatable about the central axis for selectively urging the combustible material from the first end toward the second end of the smoldering chamber;
   a smoldering heater positioned adjacent the smoke barrel for smoldering the combustible material as the auger advances the combustible material past the smoldering heater, wherein an igniter gap is defined between the second end of the smoke barrel and the smoldering heater;

a mounting bracket defining a barrel aperture, wherein the second end of the smoke barrel is seated in the barrel aperture; and a plurality of fasteners attaching the smoldering heater to the mounting bracket.

18. The smoke generating assembly of claim 17, further comprising:

a plurality of standoffs positioned between the mounting bracket and the smoldering heater to define the igniter gap.

19. The smoke generating assembly of claim 18, wherein each of the plurality of standoffs are ceramic.

20. The smoke generating assembly of claim 17, wherein the smoldering heater defines one or more apertures or slots for passing pellet dust from the smoldering heater.

* * * * *